US012173253B2

(12) United States Patent
Ludvigsen et al.

(10) Patent No.: US 12,173,253 B2
(45) Date of Patent: Dec. 24, 2024

(54) METHOD OF PRODUCING A LOW-FAT PRODUCT AND A SYSTEM FOR PRODUCING A LOW-FAT PRODUCT

(71) Applicant: Alfa Laval Corporate AB, Lund (SE)

(72) Inventors: Bent Ludvigsen, Smørum (DK); Bent Madsen, Gentofte (DK)

(73) Assignee: ALFA LAVAL CORPORATE AB, Lund (SE)

( * ) Notice: Subject to any disclaimer, the term of this patent is extended or adjusted under 35 U.S.C. 154(b) by 616 days.

(21) Appl. No.: 17/298,206

(22) PCT Filed: Nov. 21, 2019

(86) PCT No.: PCT/EP2019/082107
§ 371 (c)(1),
(2) Date: May 28, 2021

(87) PCT Pub. No.: WO2020/109135
PCT Pub. Date: Jun. 4, 2020

(65) Prior Publication Data

US 2022/0119732 A1 Apr. 21, 2022

(30) Foreign Application Priority Data

Nov. 30, 2018 (EP) .................................... 18209523

(51) Int. Cl.
*C11B 1/10* (2006.01)
*B04B 1/20* (2006.01)
(Continued)

(52) U.S. Cl.
CPC .................. *C11B 1/10* (2013.01); *B04B 1/20* (2013.01); *B04B 5/10* (2013.01); *B04B 15/02* (2013.01); *B04B 2001/2083* (2013.01)

(58) Field of Classification Search
CPC .... C11B 1/10; B04B 1/20; B04B 5/10; B04B 15/02; B04B 2001/2083
See application file for complete search history.

(56) References Cited

U.S. PATENT DOCUMENTS 4,137,335 A 1/1979 Holm et al.
5,474,790 A 12/1995 Franklin et al.
(Continued)

FOREIGN PATENT DOCUMENTS

CN 104370996 B 3/2020
EP 0 823 217 A2 2/1998
(Continued)

OTHER PUBLICATIONS

US 9,044,702 B2, 06/2015, Winsness (withdrawn)
(Continued)

*Primary Examiner* — Yate' K Cutliff
(74) *Attorney, Agent, or Firm* — Birch, Stewart, Kolasch & Birch, LLP

(57) ABSTRACT

A method of producing a low-fat product from a starting material made of a fat and/or oil containing plant- or animal item includes providing the starting material at a temperature of at least 35° C. and extracting a greater part of the extractable oil and/or fat originally contained in the plant or animal item from the starting material using a first decanter centrifuge. The first decanter centrifuge leaves a residue of solids and liquids. The residue forms the low-fat product.

18 Claims, 3 Drawing Sheets

(51) Int. Cl.

| | |
|---|---|
| ***B04B 5/10*** | (2006.01) |
| ***B04B 15/02*** | (2006.01) |

(56) References Cited

U.S. PATENT DOCUMENTS

| | | | | |
|---|---|---|---|---|
| 5,552,173 | A * | 9/1996 | Singh | A23L 13/00 426/478 |
| 5,944,597 | A | 8/1999 | Singh et al. | |
| 2013/0183422 | A1 * | 7/2013 | Ludvigsen | C11B 1/14 452/134 |
| 2014/0308417 | A1 | 10/2014 | Adachi | |
| 2015/0050402 | A1 | 2/2015 | Zitnik | |
| 2015/0136333 | A1 * | 5/2015 | Aunbirk | A23L 3/16 159/43.1 |
| 2017/0313956 | A1 | 11/2017 | Sclabos Katevas et al. | |

FOREIGN PATENT DOCUMENTS

| | | | |
|---|---|---|---|
| EP | 2 099 887 | A1 | 9/2009 |
| EP | 2 434 905 | A1 | 4/2012 |
| JP | 50-12256 | A | 2/1975 |
| JP | 10-66543 | A | 3/1998 |
| JP | 2015-516147 | A | 6/2015 |
| JP | 2017-513508 | A | 6/2017 |
| JP | 2018-500011 | A | 1/2018 |
| RU | 2 582 258 | C2 | 4/2016 |
| WO | WO 2007/038963 | A1 | 4/2007 |
| WO | WO 2008/053163 | A1 | 5/2008 |
| WO | WO 2011/154000 | A1 | 12/2011 |
| WO | WO 2015/168113 | A1 | 11/2015 |
| WO | WO 2016/075669 | A1 | 5/2016 |
| WO | WO 2018/161134 | A1 | 9/2018 |
| WO | WO 2020/011903 | A1 | 1/2020 |

OTHER PUBLICATIONS

Alfa Laval Nordic AB, "Olive oil decanter Y series", retrieved from https://www.directindustry.com/prod/alfa-laval/product-16602-1197575.html, retrieved on May 21, 2021.
International Preliminary Report on Patentability, issued in PCT/EP2019/082107, mailed Feb. 10, 2021.
International Search Report, issued in PCT/EP2019/082107, mailed Feb. 14, 2020.
Written Opinion of the International Preliminary Examining Authority, issued in PCT/EP2019/082107, mailed Oct. 20, 2020.
Written Opinion of the International Searching Authority, issued in PCT/EP2019/082107, mailed Feb. 14, 2020.
English translation of Russian Office Action and Search Report for Russian Application No. 2021118683, dated Nov. 18, 2021.
Japanese Office Action for Japanese Application No. 2021-530968, dated Aug. 15, 2022, with an English translation.

* cited by examiner

METHOD OF PRODUCING A LOW-FAT PRODUCT AND A SYSTEM FOR PRODUCING A LOW-FAT PRODUCT

INTRODUCTION

When extracting oil and/or fat from oil containing plant- or animal materials it is preferable to use centrifugal based methods for separating the oil and fat from the residual solids and liquids. Centrifugal based methods are known to be used when extracting various animal and vegetable oil and fat products such as olive oil, edible wet rendered lard and tallow, cod liver oil, fish oil, krill oil, palm oil etc.

US 2015/0136333 A1 describes extracting oil from various animal material using two- and three phase decanters. It also discloses a method of separating olive paste into oil and black water by using a heater, a malaxer and a decanter centrifuge.

A screw press may also be used for separating the solids from the liquids. WO 2007/38963 A1 describes a process for producing palm oil or vegetable oil from fruits. The oil containing fruits are first digested and then pressed to extract the crude oil. Thereafter, the crude oil is clarified using a two-phase decanter for dividing the crude oil into sludge and oil.

Further relevant prior art includes U.S. Pat. No. 9,044,702 B2 relating to a method and related system for efficiently and effectively recover a significant amount of valuable, useable oil from by-products formed during a dry milling process used for producing ethanol.

The above described methods thus separates the raw material into 3 fractions—a moist solid phase with a minor residue content of fat/oil, a water phase including the majority of the water soluble solids with a trace of fat/oil and the shelf stable oily phase.

The moist solid phase is typically dried into a solid product constituting a fiber- and/or protein product. For instance, using the above extraction methods, krill may be separated into krill oil and a solid krill residue which is processed into krill meal. However, it has been found out that the residue fat/oil content in the solid material can constitute from a few percent of the dry matter to more than 30% in extreme cases such as krill. The fat/oil content represents not only a loss of product but also a reduction of the quality of the solid product as a high fat/oil content results in a lower content of active ingredients, e.g. a low protein content. Further, the solid product is more exposed to oxidation due to high fat/oil content and there is even a risk of oxidative self-ignition of solid products having a high fat/oil content. Yet further, the fat/oil absorbs POP's such as dioxine & PCB, so a high content of fat/oil correlates to a high content of POP's in the solid product.

Process solutions to reduce the residue fat level in the solids have been developed in e.g. in the fish and meat rendering. The product to be processes is heated to approximately 92° C. to release fat and water, and then separated in a first decanter centrifuge. The decanter centrifuge can be a two- or a three-phase decanter centrifuge, where a two-phase decanter centrifuge discharges a solid phase and a liquid mixture of fat/oil and water with dissolved proteins and minerals, and the three-phase decanter centrifuge discharges solids, fat/oil and a water phase with dissolved proteins and minerals.

In a two-phase solution, the resulting liquid phase may be fed to one more disc stack centrifuges to further enhance the separation of the liquid phases. It is common to add water (preferably the defatted water phase from the disc stack centrifuge although fresh water can be used) to the discharged solids from the first decanter centrifuge and then use a second decanter centrifuge to recover a further fat reduced solid product. The liquid from the second decanter centrifuge may also be separated into further phases by the disc stack separator.

The disadvantage of using the above two-phase solution is that the disc stack centrifuge must be sized to handle twice as large water phase flow since water is added to the second decanter centrifuge. Further, a precise system must be used for recycling water from the disk stack centrifuge and allow it to be re-introduced into the solids phase before reprocessed the second decanter to maintain control of product quality and not extend the time between product batch changes.

Replacing the first two-phase decanter centrifuge with a three-phase decanter centrifuge may result in a more streamlined process, however, it is difficult to manage the product flow between the decanter centrifuges. Using a three-phase decanter in the first decanter step allows the first decanter centrifuge to separate the raw material directly into an oily phase, a water phase and a solid phase so that an improved extraction can be achieved in the second decanter centrifuge. However, this requires at the same time a separation of solids and water, which then must be remixed before the second decanter stage. When the feed to first decanter centrifuges is stopped, the flow of water and oil effluent will stop immediately, while solids continues to be discharge into the second decanter feed pump system, hereby creating overload and blockage in the pump and decanter centrifuges.

However, the above methods still result in a significant residue of fat/oil in the solid product from the second decanter centrifuge.

The object of the present invention is thus to find technologies to further reduce the fat/oil content in the solid product.

SUMMARY OF THE INVENTION

In a first aspect of the present invention the above object is realized by a method of producing a low-fat product from a starting material made of a fat and/or oil containing plant- or animal item, the method comprising the steps of:

- providing the starting material at a temperature of at least 35° C., and
- extracting a greater part of the extractable oil and/or fat originally contained in the plant or animal item from the starting material using a first decanter centrifuge, thereby leaving a residue of solids and liquids, the residue forming the low-fat product.

The separation process can be improved by the implementation of a new style of decanter centrifuge in the first separation step.

The standard decanter centrifuge separates either in two- or three phases. The two-phase decanter separates the raw material into a solid phase and a liquid phase, whereas the three-phase decanter separates the raw material into solids, oil/fat and water. The raw material is here understood as the material entering the decanter.

By using a different type of decanter centrifuge in the first separation step, where the water and solids are discharged as a uniform slurry through the small end hub, while a relative clean oil is discharged via the large end hub, it has surprisingly found out that the resulting product from the first decanter will contain a much smaller percentage of fat/oil than using any of the above mentioned prior art approaches.

The first decanter should be adapted for separating the raw material into an oil and a slurry phase essentially constituting a mixture of solids and water. One example of such decanter is the Alfa Laval Sigma decanters used for olive oil production. (https://www.alfalaval.com/products/separation/centrifugal-separators/decanters/sigma/)

The starting material may be provided as whole or finely divided parts of the oil-containing plant or animal item. The "item" should be understood as the original untreated part of the plant or animal having substantially intact cell walls. The starting material may have been treated, i.e. by extracting various substances, however, no removal of solids or oil should have taken place, i.e. no pressing etc, before the first decanter step. In the first step the item is heated to an elevated temperature in order to maximize the release of fat/oil and water from the item. The high temperature causes the fat in the cell to liquify and/or the cell walls of the starting material to be broken down such that the cells may release the oil and fat contained in the cell. Using high temperatures for extracting the oil generates a higher oil yield compared to methods conducted in room temperature, resulting in a lower fat content remaining in the residual solid material. The heating to at least 35° C. implies that the present method cannot be used for production of olive oil.

The above method yields a solid product with a very low oil/fat content. Experiments using meat and fish have shown values between 2% and 2.5%, with an average about 2.3%.

Importantly, the item is not pressed before entering the decanter, i.e. the whole oil-containing material is entering the decanter. In this way it is ensured that no solid material is lost and that the processed solid material has a very low oil/fat content. It is also ensured that the oil yield is high. The solid material may subsequently be dried to remove any residual liquid and the dried solid product may be used for different purposes such as animal feed etc.

According to a further embodiment of the first aspect, the item is made from palm fruit, fish, meat or krill.

Unlike for instance olive oil, the above-mentioned plant- and animal oils may be extracted using heat with no or only little loss of quality.

According to a further embodiment of the first aspect, the starting material is provided at a temperature of between 40° C. and 142° C., more preferably between 60° C. and 120° C., most preferably between 80° C. and 100° C., such as 92° C. or 95° C.

To ensure a quick and complete breakdown of the cell walls of the item and/or liquification of the fat a higher heating temperature than 35° C. can be used. Preferably, the item is heated to the boiling temperature of water or close to it. The item may e.g. be steam cooked by injection of steam into the item.

According to a further embodiment of the first aspect, the starting material is pumpable and/or the starting material is provided in an aqueous solution.

In this way the item is easily transferred between the heater, first decanter and second decanter.

The slurry output from the first decanter is typically also pumpable.

According to a further embodiment of the first aspect, the first decanter centrifuge is of a two-phase type, preferably of the leading conveyor style.

Using a two-phase decanter centrifuge type as the first decanter centrifuge allows for an optimisation of the first step in which the item is separated into the oily phase and the slurry. In this way the oily phase flows out at the large hub of the decanter centrifuge and the slurry containing the water and the solids flow out via the small end hub. The decanter centrifuge comprises a conveyor in the form of a screw conveyor. The screw conveyor may be of the leading style, i.e. the screw conveyor rotates faster than the bowl, or the trailing style, i.e. the screw conveyor rotates slower than the bowl. The use of a leading conveyor style optimise the retention time of the solids during the transport of the slurry towards the small end hub of the decanter centrifuge, thereby maximizing the release of oil from the slurry.

According to a further embodiment of the first aspect, the method comprises the additional step of dewatering the low-fat product using a dewatering apparatus.

In the subsequent step, the solids and liquids of the residue forming the low fat product are separated using a dewatering apparatus which may be a second decanter or a belt press. The liquids are essentially water. The second decanter may be a standard decanter. The solids are thus separated from the liquid in the second decanter step and not in the first decanter step as used in some prior art. This reduces the amount of oil/fat remaining in the solids forming the dewatered low-fat product.

According to a further embodiment of the first aspect, dewatering apparatus is a second decanter, the first decanter defines a first bowl and a first conveyor rotating with a first differential speed between themselves, the second decanter defines a second bowl and a second conveyor rotating with a second differential speed between themselves, the first differential speed being higher that the second differential speed.

The higher differential speed of the first decanter centrifuge simplifies the conveying of the slurry having a high water content, whereas the lower differential speed of the second decanter centrifuge allows the solids being conveyed in the conical part of the decanter centrifuge sufficient time to dry up before leaving the decanter through the outlet at the small end hub. This allows more of the liquids, including any small oil part remaining in the solids more time to flow out through the large end hub, yielding less oil/fat in the solids.

According to a further embodiment of the first aspect, the first differential speed being between 25 rpm and 75 rpm, preferably between 30 rpm and 50 rpm, and/or, the second differential speed being between 1 rpm and 25 rpm, preferably between 5 rpm and 15 rpm.

The above differential speeds between the bowl and the conveyor are suitable for the purpose discussed further above.

According to a further embodiment of the first aspect, the first decanter define a first large end hub, a first small end hub located opposite the first large end hub, a first central axis extending between the first large end hub and the first small end hub, a first light phase discharge located at the first large end hub and defining a first liquid level, and a first heavy phase outlet located at the first small end hub, wherein the first heavy phase outlet is located substantially at the first liquid level.

Between the large end hub and the small end hub the bowl extends in a cylindrical shape adjacent the large end hub and in a conical shape adjacent the small end hub. The light phase discharge at the large end hub is in the first decanter centrifuge defining the outlet for the oily phase, whereas the slurry containing water and solids are discharged at the heavy phase outlet at small end hub. The first liquid level is defined between the oily phase and the water phase in the bowl. The light phase discharge has a weir which is set to define the first liquid level at a specific distance from the axis allowing the oil/fat to be discharged at the light phase outlet but preventing solids/water to be discharged there. The heavy phase outlet should be able to allow water and solids to be discharged as a slurry and thus it is beneficial to set the light phase outlet such that the first liquid level has a suitable radial position to give a good phase separation.

According to a further embodiment of the first aspect, an infeed for the starting material is located adjacent the first large end hub.

In this way the slurry must travel a longer distance within the bowl than the oily phase. This allows the solids to be able to release more oil/fat before reaching the heavy phase outlet, whereas it simplifies the discharge of the already released oily phase at the light phase outlet.

According to a further embodiment of the first aspect, the second decanter Is adapted to deliver a dry cake. It may be a conventional two phase decanter or a three phase decanter.

According to a further embodiment of the first aspect, the effluent phase is further separated into a residual oily phase, a sludge phase and a liquid phase by using a skimmer disk stack separator.

According to a further embodiment of the first aspect the first decanter comprises a baffle inside the first decanter.

The baffle is situated at the interconnection between the cylindrical part of the bowl and the conical part of the bowl and extends from the axis of the screw conveyor to beyond the first liquid level between the oily phase and the water phase in the bowl of the first decanter. It thus prevents the oily phase from being discharged at the heavy phase discharge.

According to a further embodiment of the first aspect the item has a solid content of at least 5%, such as between 5-50%, preferably between 10%-30%, more preferably about 15%.

The solid content of the item should be high enough for yielding a sufficiently large solid product as output, while still allowing the item to be flowable for being able to be used in the decanter centrifuges. It implies that the item constitutes whole or finely divided parts of the oil containing plant or animal having no oil-containing parts of the plant or animal removed by e.g. pressing of the item before the first decanter step.

According to a further embodiment of the first aspect the starting material is heated by a steam heater.

The steam heater allows for a quick rise in temperature of the item which also allowing some condensed steam to mix with the starting product making the starting product more flowable.

According to a second aspect of the present invention, the above object is realized by a system of producing a low-fat product from a starting material made of a fat and/or oil containing plant- or animal item, the system comprising:

- a heater for heating the starting material to a temperature of at least 35° C., and
- a first decanter centrifuge for extracting a greater part of the extractable oil and/or fat originally contained in the plant or animal item from the starting material and leaving a residue of solids and liquids, the residue forming the low-fat product.

The above system according to the second aspect is preferably used together with any of the methods according to the first aspect.

DETAILED DESCRIPTION OF THE DRAWINGS

Figure 1:
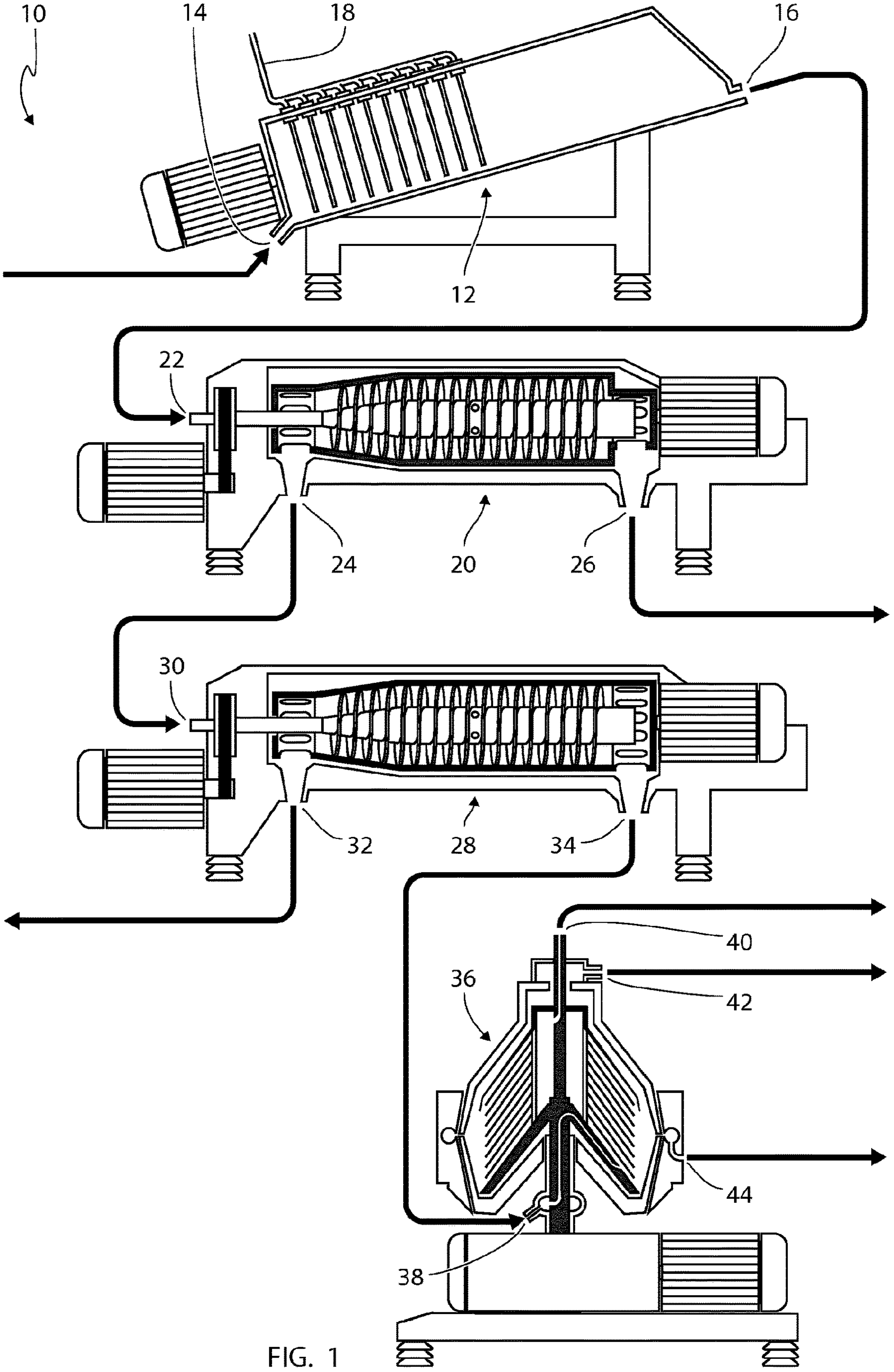
FIG. 1 shows a setup according to the present invention.

FIG. 1 shows a decanter setup 10 for producing a fat reduced product from an item according to the present invention. The item comprising oily organic material is first heated in a steam heater 12. The item may be plant material such as whole or parts of palm fruit, or it may be animal material such as fish or krill or part of fish such cod liver. It may also be other animal material such as edible wet rendered lard or tallow. The item is received at an inlet 14 of the steam heater 12 and is fed to an outlet 16 of the steam heater 12. The item is thereby exposed to steam via a steam injector 18 and the temperature of the item is elevated to about 92-95° C. This causes the cell walls of the item to break down into an oily phase, a water phase and solids. In the next steps, the oily phase, the water phase and the solids are separated. It should thereby be ensured that the solid material contains as little oil as possible in order to achieve a fat reduced solid product.

The heated item is introduced into a first decanter centrifuge 20 via an inlet 22. The first decanter centrifuge 20 separates the heated item into an oil phase and a slurry containing solids and water. The slurry is discharged at a slurry outlet 24, and the oily phase containing oil and/or fat is discharged at an oil phase outlet 26.

The slurry is introduced into a second decanter centrifuge 28 via a slurry inlet 30. The second decanter centrifuge 28 separates the heated item into a solid phase which is discharged at a solid outlet 32, and a liquid phase which is discharged at a liquid outlet 34. The solid material containing mostly fibre and protein from the item and an effluent phase containing mostly water from the item.

Optionally, the effluent obtained from the liquid outlet 34 is introduced into a disc stack centrifuge 36 via an inlet 38. The disk stack centrifuge 36 operates at high speed to further separate the liquid into an oily part discharged at an outlet 40, stick water discharged at an outlet 42 and a sludge discharged at an outlet 44.

Figure 2:
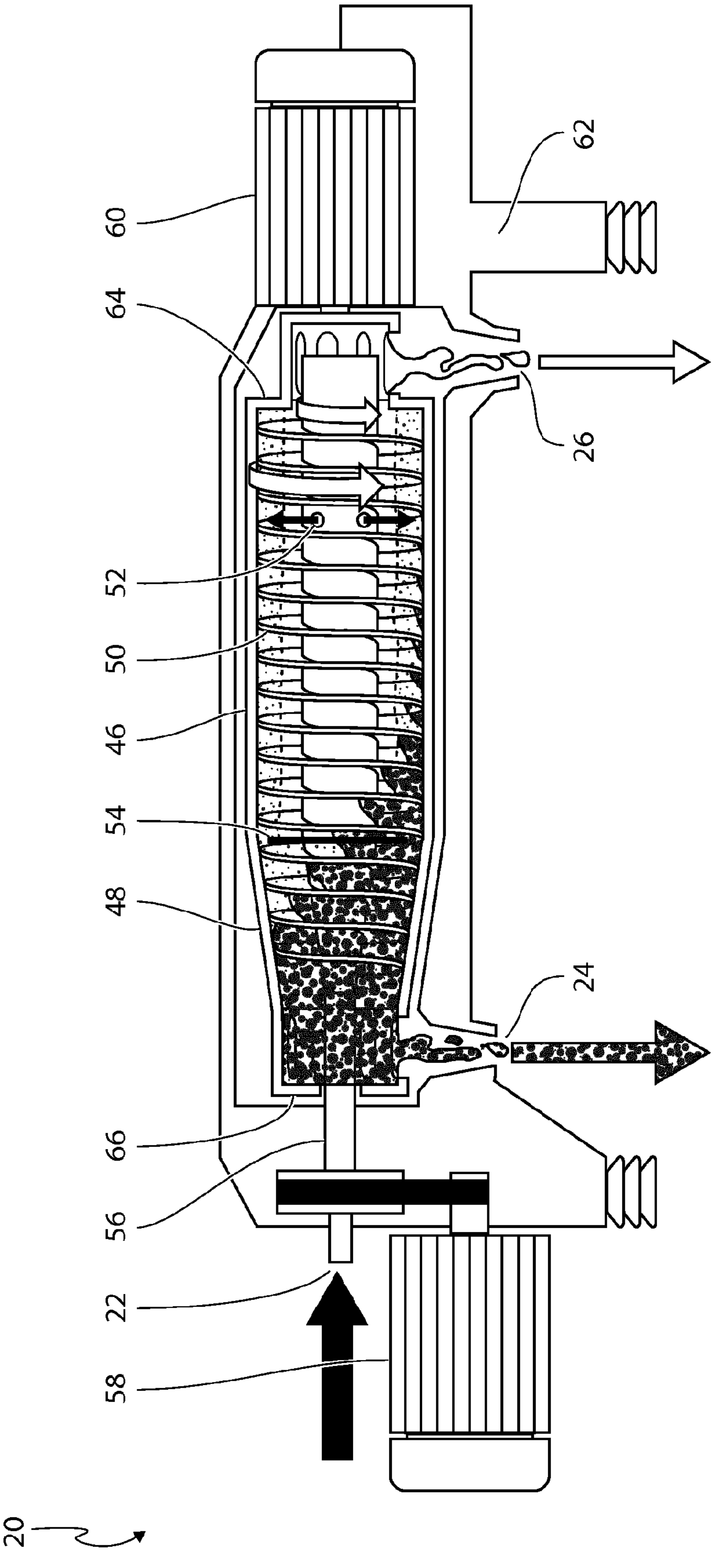
FIG. 2 shows a first decanter centrifuge according to the present invention.

FIG. 2 shows the first decanter centrifuge 20 according to the present invention. The decanter centrifuge 20 comprise a rotating bowl which defines a cylindrical bowl part 46 having the oily phase outlet 26 and a conical bowl part 48 having the slurry outlet 24.

A screw conveyor 50 is located inside the bowl between the oily phase outlet 26 and the slurry outlet 24. The screw conveyor 50 comprise apertures 52 for introduction of the heated item. A baffle 54 is optionally provided for preventing that the oily phase from flowing out though the slurry outlet 24. The baffle 54 defines a disk extending from the centre axis of the screw conveyor 50 outwardly towards the bowl. The item is fed into the decanter centrifuge 20 at the inlet 22. The screw conveyor defines a hollow axle 56 between the inlet 22 and the infeed 52. The axle 56 is rotated by a first motor 58 via a first gear whereas the bowl is rotated by a second motor 60. The decanter centrifuge 20 is held in a frame 62.

The rotation of the bowl causes the heavy material to accumulate at the bowl wall whereas the light material accumulated close to the axle 56. The screw conveyor 50 rotates at a different speed comparted to the bowl in order to force the solids collected on the walls of the bowl by the centrifugal force towards the slurry outlet. The cylindrical bowl part 46 is delimited by a large end hub 64 and the conical bowl part 48 is delimited by a small end hub 66. The oily phase outlet 26 at the large end hub 64 defines a liquid level defined between the oily phase which is light and due to the centrifugal force will accumulate close to the axle of the screw conveyor and the water phase which is heavier and accumulated closer to the bowl wall. The oily phase outlet 26 at the large end hub 64 and the slurry outlet 24 at the small end hub 66 are located about the same distance from the axle 56 in order to allow the slurry being a mixture of the water phase and the solids phase to be discharged at the same slurry outlet 24. The infeed 52 is preferably located closer to the large end hub 64 than the small end hub 66 in order to allow the item sufficient time moving inside the bowl to release as much oily phase as possible.

Figure 3:
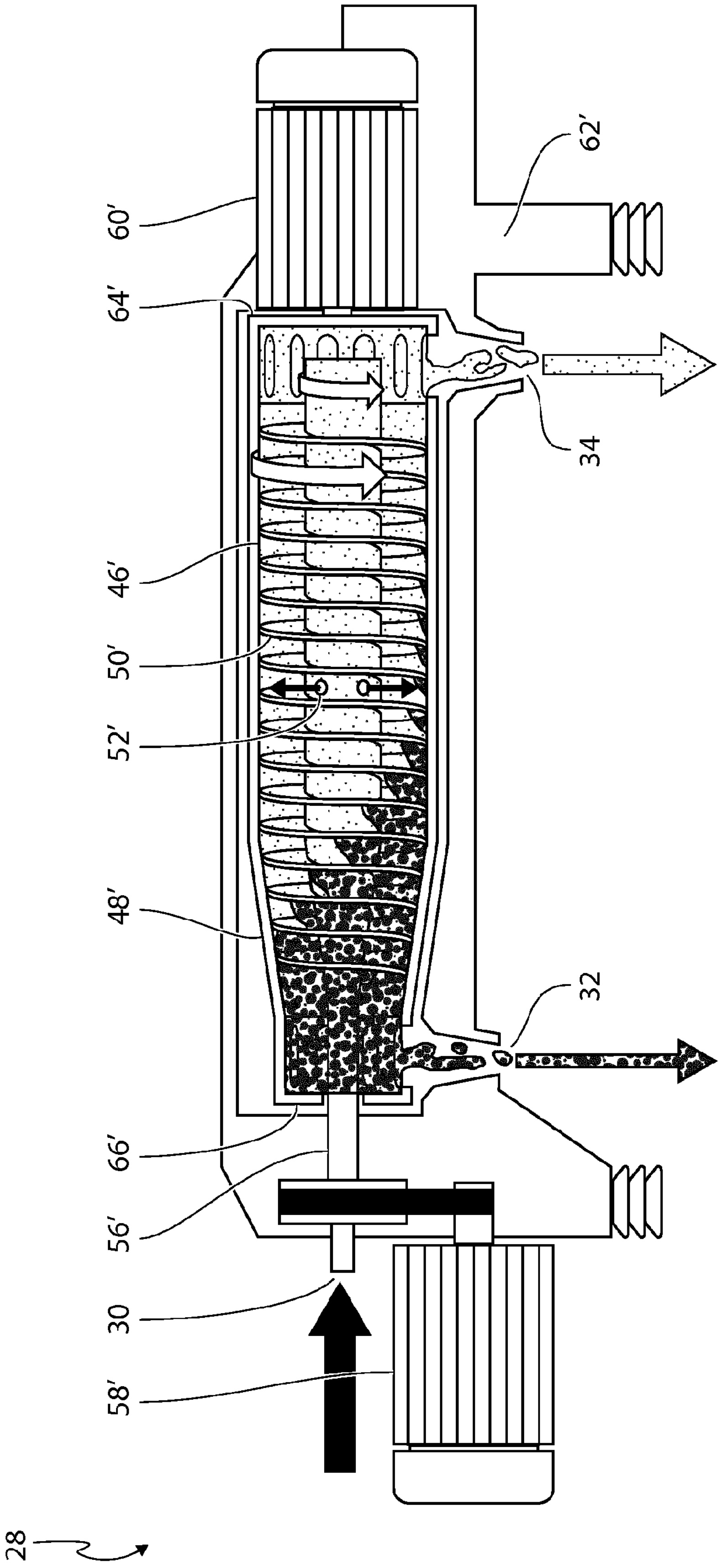
FIG. 3 shows a second decanter centrifuge according to the present invention.

FIG. 3 shows a second decanter centrifuge 28 according to the present invention. The second decanter centrifuge 28 is similar to the first decanter centrifuge, however, it has a slightly different setup in order to optimize the separation of liquid and solids. The reference numerals used in connection with the second decanter centrifuge 28 provided with a (') refers to the same part fulfilling the same function as the corresponding reference numeral in connection with the first decanter centrifuge 20. Hereinafter, only the differentiating feature will be discussed.

The liquid outlet 34 is located more distant from the axle 66' compared to the first decanter 20, allowing the conical part of the bowl 48' to define a dry beach area which allows the solids to dry off before being discharged through the solid outlet 32. Further, the inlet 52' is located substantially in the middle between the large end hub 64 and the small end hub 66 in order to prevent any solids from being discharged at the liquid outlet 34.

EXAMPLE

A proof-of-concept experiment has been conducted by the applicant using the above setup. The starting product has the following composition: 40% oil, 15% solids and 45% water. The steam heater added 16% water in the form of steam.

The first decanter separated the heated item into an oily phase and a slurry phase: The oily phase has the following composition: 99% oil, 0% solids and 1% water. The slurry phase has the following composition: 2.6% oil, 19.3% solids and 78.1% water.

The second decanter separated the slurry into a solid product and an effluent phase: The solid product has the following composition: 2.3% oil, 42.7% solids and 55% water. The effluent phase has the following composition: 1.6% oil, 5.6% solids and 92.8% water.

The (optional) disc stack centrifuge separated the effluent into an oily part, sludge and stick water: The oily part has the following composition: 62% oil, 3.0% solids and 35% water. The sludge has the following composition: 2.4% oil, 12% solids and 85.6% water. The stick water has the following composition: 0.2% oil, 5.4% solids and 94.4% water.

The invention claimed is:

1. A method of producing a low-fat product from a starting material, the method comprising:

providing the starting material at a temperature of at least 35° C., the starting material comprising a plant or animal item, said plant or animal item comprising fat and/or oil; and extracting an oily phase having a greater part of extractable oil and/or fat contained in the plant or animal item from the starting material using a first decanter centrifuge, thereby leaving a slurry phase having a residue of solids and liquids, the residue forming the low-fat product, wherein the first decanter centrifuge is a two-phase type decanter comprising a first large end hub, a first small end hub opposite the first large end hub and a first bowl extending therebetween in a cylindrical shape adjacent the large end hub and in a conical shape adjacent the small end hub, wherein the first large end hub has a first light phase discharge defining an oil phase outlet for the oily phase and the first small end hub has a first heavy phase outlet allowing water and solids defining the slurry phase to be discharged from a slurry outlet, and wherein the first light phase discharge has a weir set for defining a first liquid level at a specific distance from an axle allowing the oily phase to be discharged at the oil phase outlet while preventing the water and solids from being discharged as the slurry at the oil phase outlet of the first light phase discharge.

2. The method according to claim 1, wherein the item comprises palm fruit, fish, meat or krill.

3. The method according to claim 1, wherein the starting material is provided at a temperature of between 40° C. and 142° C.

4. The method according to claim 1, wherein the starting material is pumpable and/or wherein the starting material is provided in an aqueous solution.

5. The method according to claim 1, further comprising: dewatering the low-fat product using a dewatering apparatus.

6. The method according to claim 5, wherein the dewatering apparatus is a second decanter or a belt press.

7. The method according to claim 5, wherein the dewatering apparatus is a second decanter, wherein the first decanter defines the first bowl and a first conveyor rotating with a first differential speed therebetween, wherein the second decanter defines a second bowl and a second conveyor rotating with a second differential speed therebetween, and wherein the first differential speed is higher than the second differential speed.

8. The method according to claim 7, wherein the first differential speed is between 25 rpm and 75 rpm, and the second differential speed being between 1 rpm and 25 rpm.

9. The method according to claim 1, wherein the first decanter defines a first central axis extending between the first large end hub and the first small end hub, the first light phase discharge located at the first large end hub and defining the first liquid level, and the first heavy phase outlet located at the first small end hub, and wherein the first heavy phase outlet is located substantially at the first liquid level.

10. The method according to claim 9, wherein an infeed for the starting material is located adjacent the first large end hub.

11. The method according to claim 1, wherein the first decanter comprises a baffle for directing the flow inside the first decanter.

12. The method according to claim 1, wherein the item has a solid content of at least 5%.

13. The method according to claim 1, wherein the starting material is heated by a steam heater.

14. The method according to claim 1, wherein the starting material is provided at a temperature of between 60° C. and 120° C.

15. The method according to claim 1, wherein the starting material is provided at a temperature of between 80° C. and 100° C.

16. The method according to claim 1, wherein the first decanter centrifuge is of the leading conveyor style.

17. The method according to claim 7, wherein the first differential speed is between 30 rpm and 50 rpm, and the second differential speed being between 5 rpm and 15 rpm.

18. The method according to claim 1, wherein the plant or animal item has a solid content between 5-50%.

* * * * *